United States Patent
Espindola et al.

[11] Patent Number: 6,151,438
[45] Date of Patent: *Nov. 21, 2000

[54] FIBER DEVICE HAVING VARIABLE REFRACTIVE INDEX REGION PROXIMAL THE CORE

[75] Inventors: Rolando Patricio Espindola, New Providence, N.J.; Jefferson Lynn Wagener, Aberdeen, Wash.; Robert Scott Windeler, Clinton, N.J.

[73] Assignee: Lucent Technologies Inc., Murray Hill, N.J.

[*] Notice: This patent is subject to a terminal disclaimer.

[21] Appl. No.: 09/160,779

[22] Filed: Sep. 24, 1998

[51] Int. Cl.⁷ ............................................. G02B 6/00
[52] U.S. Cl. ............................ 385/140; 385/37; 385/12; 385/10; 385/122; 385/123; 385/124
[58] Field of Search .................... 385/140, 37, 27, 385/6, 12, 10, 122, 123, 124

[56] References Cited

U.S. PATENT DOCUMENTS

| | | | |
|---|---|---|---|
| 5,082,345 | 1/1992 | Cammons et al. | 385/140 X |
| 5,319,733 | 6/1994 | Emmons et al. | 385/140 |

*Primary Examiner*—Phan T. H. Palmer
*Attorney, Agent, or Firm*—Mathews, Collins, Shepherd & Gould, P.A.

[57] ABSTRACT

A device for changing the power levels of signals transmitted by an optical fiber, along with signal modulation and wavelength routing, comprises a length of optical fiber in which for a predetermined section of the length of the fiber, the fiber core is surrounded by a cladding having one or more variable refractive index (VRI) regions disposed therein in close proximity to the core. The VRI regions are fabricated with a material having an index of refraction higher than that of the cladding and may comprise a variable attenuator.

20 Claims, 2 Drawing Sheets

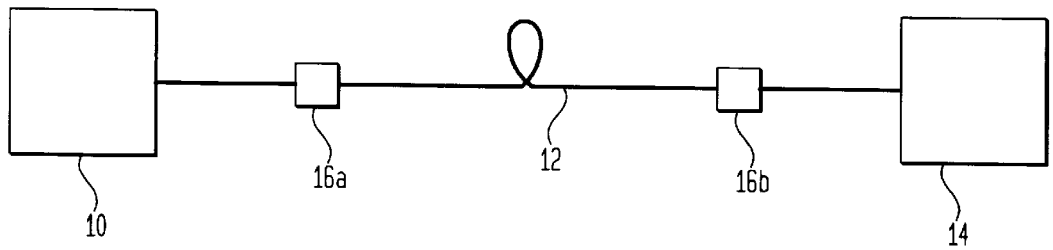
FIG. 1A
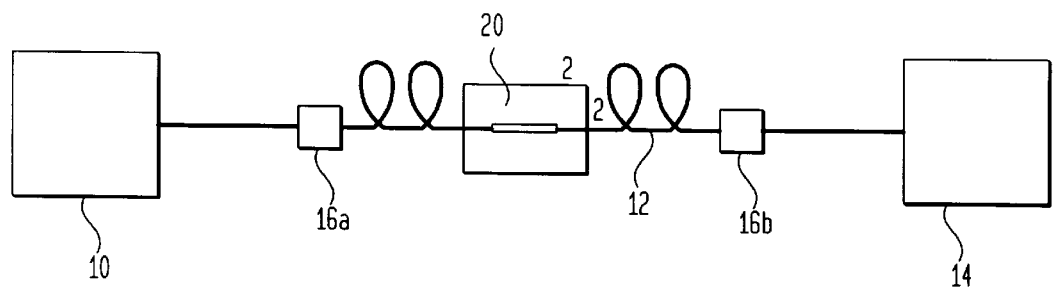
FIG. 1B
FIG. 2
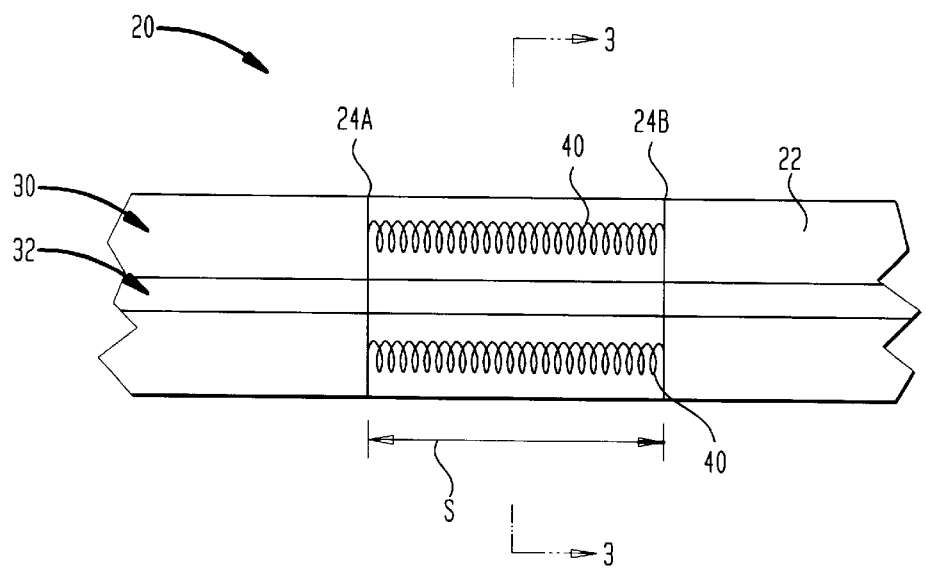

FIBER DEVICE HAVING VARIABLE REFRACTIVE INDEX REGION PROXIMAL THE CORE

RELATED APPLICATIONS

This application is related to U.S. application Ser. No. 09/159,435, filed concomitantly herewith, titled "Fiber Device Having Variable Refractive Index Region Proximal the Core," by the same inventive entity herein and assigned to the present assignee.

FIELD OF THE INVENTION

The present invention relates to fiber structures having one or more variable refractive index regions adjacent the core for index modulation. The fiber structure is particularly useful for providing attenuators including variable attenuators of optical communications systems.

BACKGROUND OF THE INVENTION

Optical fibers are well known in the art and useful for many applications in modern communications systems. A typical fiber optic communications system, for example, is shown schematically in FIG. 1A. The system comprises a source of optical signals 10, a length of optical fiber 12 coupled to the source, and a receiver 14 coupled to the fiber for receiving the signals. One or more amplifying systems 16a, 16b, may be disposed along the fiber for amplifying the transmitted signal. Filters and attenuators are useful in these systems to change the power levels of various signals, especially in wavelength division multiplexed systems, along with signal modulation and wavelength routing.

Basically, the optical fiber 12 shown in FIG. 1A comprises an inner core fabricated from a dielectric material having a certain index of refraction, and a cladding surrounding the core. The cladding is comprised of a material having a lower index of refraction than the core. As long as the refractive index of the core exceeds that of the cladding, a light beam propagated along the core exhibits total internal reflection, and it is guided along the length of the core.

Since the conventional optical fiber confines most of the light in the core region, with such conventional fibers the ability to effect propagation behavior of the light in the fiber core is significantly limited. With conventional fibers, to change the propagation behavior of light in the core or in attenuating the signal, one is limited in the configurations that may be used, usually to use of temperature and/or strain. For example, U.S. Pat. No. 5,321,790 to Takahashi, et al., "Optical Attenuator Using an Optical Fiber and Method and Apparatus for Producing Same," issued Jun. 14, 1994 and incorporated herein, shows an attenuator formed by heating the fiber with electrodes or gas burners and compressing the fiber in the axial direction to provide a light attenuating portion along the fiber. A low reflection attenuation device for use in an optical fiber connector is described in U.S. Pat. No. 5,082,345 issued to Cammons el al. on Jan. 21, 1992, entitled "Optical Fiber Connecting Device Including Attenuator" (the "Cammons patent") assigned to the assignee herein, which is hereby incorporated by reference. The Cammons patent describes use of polymethylmethacrylate (PMMA) to fabricate a disc-shaped attenuator portion disposed at the end of the transmission path or within an optical fiber connector. The attenuator portion produces −40 dB reflectance which is suitable for many applications but less than optimal for high performance optical fiber systems.

Variable attenuators, i.e., in which the degree of attenuation is controlled, typically have comprised complicated structures with moving parts that rotate or otherwise move the position of the fiber or attenuator. For example, U.S. Pat. No. 5,745,634 to Garrett, et al., "Voltage Controlled Attenuator," issued Apr. 28, 1998 and incorporated herein, shows a variable attenuator with which the variation in the attenuation is obtained by actuating a dc motor which displaces the position of the attenuator. Similarly, U.S. Pat. No. 5,677,977 to Smith, "Optical Attenuator," issued Oct. 14, 1997 and incorporated herein, shows a variable attenuator with which the variation in the attenuation is obtained by providing a circular loop of optical fiber which is rotated with use of a lockable rotating shaft clamped to the side of the loop. U.S. Pat. No. 5,781,341 to Lee, "Motorized Tunable Filter and Motorized Variable Attenuator," issued Jul. 14, 1998 and incorporated herein, shows a variable attenuator with use of a cam attached to a collimator; the cam rotates the collimator to adjust the insertion loss. U.S. Pat. No. 5,319,733 to Emmons et al., "Variable Fiber Optical Attenuator," issued Jun. 7, 1994 and incorporated herein, shows a variable attenuator with use of two terminated fibers that are placed in holdings with their terminal ends aligned; the holders are rotated relative to each other while the alignment is maintained to provide variable attenuation. As can be seen, each of these variable attenuators involve use of moving parts.

As may be appreciated, those concerned with the development of optical communications systems and more particularly, fiber devices, continually search for new components and designs including new attenuator designs. As optical communications systems become more advanced, there is growing interest in increasing the number of wavelengths that may be transmitted by the systems and therefore in new methods and devices for modulating, filtering, and switching wavelength channels. The instant invention provides a new structure for an optical fiber device and in particular, a variable attenuator device that involves no moving parts.

SUMMARY OF THE INVENTION

Summarily described, the invention embraces a tunable fiber device for use in a optical communications system having a core fabricated with a material having a certain refractive index; a cladding surrounding the core having a refractive index less than the refractive index of the core; and at least one variable refractive index (VRI) region disposed within the first cladding in close proximity to the core. The VRI region has a refractive index different from that of the cladding and of the core, and greater than that of the cladding, to modify the effective index of the mode propagated along the core. The VRI region may provide a variable amount of attenuation to the light at selected wavelengths without use of moving parts.

BRIEF DESCRIPTION OF THE DRAWINGS

For a better understanding of the invention, an exemplary embodiment is described below, considered together with the accompanying drawings, in which:

FIG. 1A shows a schematic illustration of an optical communications system;

FIG. 1B is a schematic illustration of an optical communications system including the inventive device;

FIG. 2 shows a cross-sectional view of one embodiment of an inventive fiber device taken along the length.

Figure 3A:
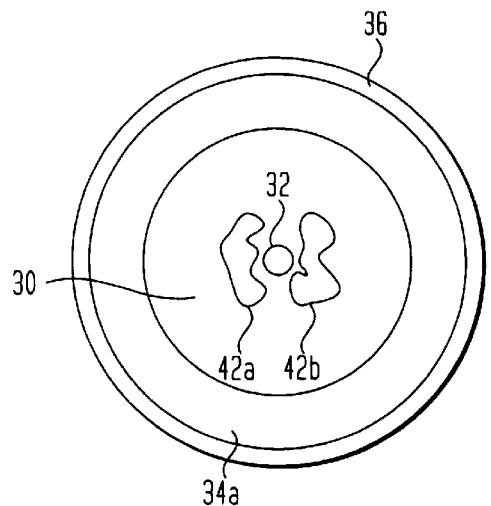
FIGS. 3A, 3B, and 3C show cross-sectional views of alternate embodiments of the inventive fiber device, taken along a cross-sectional width following the line 3—3 of FIG. 2.

It is to be understood that these drawings are for the purposes of illustrating the concepts of the invention and are not to scale.

DETAILED DESCRIPTION OF THE INVENTION

Referring to FIG. 1B, it will be appreciated that the inventive device 20 may comprise part of an optical fiber communication system that further comprises elements such as a transmitter 10, a receiver 14, and an optical path 12 connecting transmitter and receiver, with one or more amplifiers 16a, 16b, disposed along the optical path. The device 20 may be placed at select regions of the optical path, and one or more devices 20 can be used in the optical system. FIG. 2 shows the device 20 in further detail providing an exploded, cross-sectional view at boxed region 2—2 of FIG. 1B.

Referring to FIG. 2, applicants have discovered that a fiber optic device useful for modifying the mode of light propagation can be fabricated by providing a length of fiber 22 where a predetermined section of the fiber, "s", referred to herein as the attenuator section, contains one or more variable refractive index (VRI) regions 40. By "variable refractive index region" it is meant that this region 40 is comprised of a material having a refractive index different than that of the core or the cladding and whose refractive index is capable of being varied either internally or externally, e.g., the "internal" variation comprising a variation occurring due to a change in the length, shape, or size of the VRI or due to a gradient over the width or length of the device such as with use of different concentrations of dopants, and the "external" variation comprising a variation occurring as a function of parameters such as time, temperature, or externally applied electric or magnetic fields. The length of the fiber that does not include the attenuator section is referred to herein as the standard fiber section. The interface regions where the attenuator section is joined with the standard fiber section are referred to herein as first and second connections 24a, 24b. The VRI region 40 is disposed in the cladding 30 of the fiber in close proximity to the core 32. By "close proximity to the core" it is meant that at least a portion of at least one VRI region is sufficiently close to the core so that light is guided from the core into the VRI region. Preferably, the distance from the center of the fiber to the outer edge of the VRI region proximal the core is less than or equal to one mode field diameter, which is known in the field, and the distance "close proximity to the core" advantageously may be determined given that parameter. The VRI region may produce a wavelength dependent loss that may be modified or varied with appropriate selection of the materials used to fabricate these regions.

The VRI region or regions may initially comprise air or holes, which can later be filled with a material of choice, or they may be doped with materials having different refractive indices than either the core or the cladding. Also, the VRI regions may have variable concentrations of dopants or be doped with different materials along their cross-sections to produce gradients of increasing or decreasing refractive indices. Dopants may include one or more of Ge, Al, B, P, Ga, La, and rare-earth dopants as described in U.S. Pat. No. 4,666,247 to MacChesney el al., "Multiconstituent Optical Fiber," issued May 19, 1987 (the "'247 patent"), assigned to the present assignee, which is hereby incorporated by reference. The degree of attenuation may be varied by altering the materials comprising the VRI region, by changing the length of the attenuator section, by using temperature-sensitive materials or polymers for fabricating the VRI region and heating or cooling the fiber, by fabricating the VRI region with a crystal and applying an electric or magnetic field preferably adjacent the attenuator section (e.g., with electrodes exterior the fiber), or with use of other materials or methods for altering the index of the VRI region in the range from above the index of the cladding to near or above the index of the core. The VRI regions can be fabricated with materials that otherwise could not be incorporated within the fiber when drawn; in other words, materials that are unavailable for fabricating the cladding regions may be used to fabricate the VRI regions, which allows for a wide choice of material dispersion with these regions. Preferably, the refractive index of the VRI region is not identical to the index of the cladding or the core.

In operation, if the VRI region has an index the same as that of the cladding, there is essentially no effect. The connections 24a, 24b may cause a small amount of insertion loss, but this loss is negligible, i.e., about less than 0.5 dB. As the index of the VRI regions is raised from above the refractive index of the cladding toward or above the higher refractive index of the core, the fundamental mode will spread and will therefore be weakly guided along the core, and there will be an increasing loss. The further the index is raised above that of the cladding, the greater the loss will become. As the refractive index of the VRI increases, the fiber may become multimoded depending on the location, shape, and size of the VRI region. As a multimoded fiber, light impinging on the fiber within the VRI region excites multimodes that may interfere at the device output, e.g., on what would otherwise be a standard, single mode fiber.

Within the length of the attenuator section, the multiple modes will beat together, and at the area adjacent the connection 24a, 24b, e.g., at the entrance to the standard fiber section, the modes will recombine either in-phase or out-of-phase, depending on the wavelength. When they combine in-phase, there is very little attenuation in the device, and when they combine out-of-phase, there is significant attenuation. Whether the modes combine in or out of phase, and thus, the degree of attenuation, is dependent on the wavelength. The attenuator section preferably ranges in length from about 100 microns to about 10 cm and may be longer, e.g., it may have a length of up to or greater than one meter. For long attenuator sections, the spacing between wavelengths that exhibit significant attenuation is smaller than for shorter attenuation sections. As noted above, the degree of attenuation also may be altered by varying the constituents comprising the VRI regions. The inventive fiber device is thus advantageous for producing a variable loss.

Figure 3B:
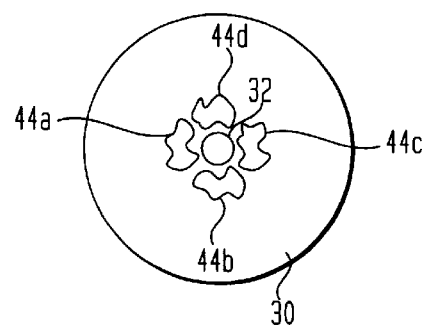
Figure 3C:
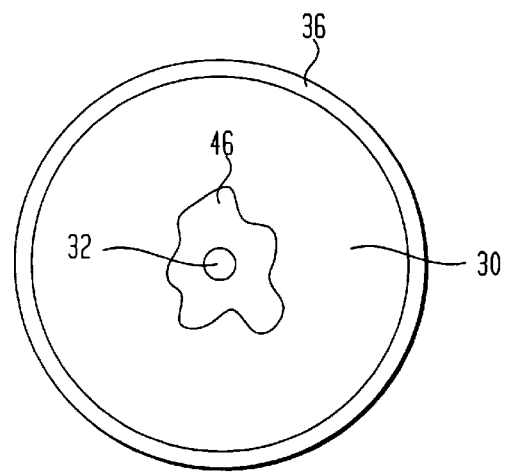

Referring to FIGS. 3A through 3C, there are shown cross-sectional views of alternative embodiments of the inventive device, taken along the width at the cross-sectional line 3—3 of FIG. 2. The length of fiber has a core 32, surrounded by at least a first cladding layer 30. The core should be comprised of a material having a relatively high index of refraction, for example, a $SiO_2:GeO_2$ core may be used, with $GeO_2$ being added to raise the refractive index. The index may also be raised with use of dopants, as previously discussed with reference to the VRI region and described in the '247 patent. The inner cladding 34 is comprised of a material having a lower index of refraction than the core, and may be undoped silicate glass.

An optional second cladding 34 may surround the first inner cladding 30. Thus, the refractive indices of the layers would become progressively less moving from the core to the second cladding 34. However, use of a second cladding layer is not needed to practice this invention. A substantially circular outer polymer layer 48 may be used if desired to protect the fiber.

Within the inner cladding 34, adjacent the core 32, there are disposed one or more VRI regions 40. It is important that at least one of the variable refractive index regions be located in close proximity to the core, as defined above. The VRI regions may be formed in various shapes and have varying thicknesses, depending also on the dimensions of the fiber. The regions need not be symmetrical which is advantageous as this relaxes the processing conditions.

For example, the VRI regions may comprise essentially one or more amorphous rods 42a, 42b, as shown in FIG. 3A, on either side of the core 32. Alternatively, the regions may comprise a plurality of substantially non-circular isolated regions 44a, 44b, 44c, 44d, suspended within the cladding 30, as shown in FIG. 3B. In yet another embodiment, the VRI region may comprise a substantially non-circular region 46 concentrically surrounding the core as in FIG. 3C. The VRI regions can be amorphous, without any clearly defined shape, thereby avoiding manufacturing difficulties associated with obtaining a particular configuration. Generally, VRI regions shaped substantially as circles or disks (e.g., as pie wedges with no "points"), are preferred as this eases the manufacturing steps. Preferably, more than two VRI regions are used so that there are no distinctly different axes located 90 degrees apart, as this reduces the likelihood of there being fundamental mode birefringence associated with the VRI regions. Manufacturing the inventive fiber device with a plurality of regions (e.g., from three to six or more) around the core is not substantially more difficult than making the device with just two VRI regions.

The VRI regions can be produced by selective diffusion or implantation of dopants in the cladding, applying doping techniques known in the field. These regions also may be fabricated with materials that are responsive to electric or magnetic fields or temperature, such as liquid crystals or certain polymers, and then the refractive indices of the VRI regions may be adjusted by selectively applying magnetic or electric fields or heating or cooling the fiber. A straightforward method of making the optical fiber device comprising the attenuator section involves providing a portion of a fiber having holes disposed along its length adjacent the core. Refractive index oil, such as oil manufactured by Cargille Inc., of Cedar Grove, N.J., or other liquid materials may be easily drawn into the holes by capillary action. Alternatively, if capillary action is not sufficient to draw the liquid into the holes, a vacuum pump may be used. In either case, a section of the holes adjacent the interfaces 24a, 24b preferably should be left hollow to ease the process of joining the attenuator section to the standard fiber section. When a solid refractive index material is used to form the VRI region, preferably the VRI is formed during the processing of the fiber itself.

It will be understood that the embodiments described herein are merely exemplary and that a person skilled in the art may make variations and modifications without departing from the spirit and scope of the invention. All such variations and modifications are intended to be included within the scope of the appended claims.

We claim:

1. An article including an optical fiber device, the device comprising:

a length of optical fiber having a core fabricated with a material having a predetermined refractive index and a cladding surrounding the core having a refractive index less than the refractive index of the core; and at least one variable refractive index (VRI) region disposed within the cladding in close proximity to the core for a predetermined section of the length of optical fiber, the VRI region having a refractive index higher than that of the cladding for modifying the index of the mode propagated along the core.

2. The article of claim 1, wherein the optical fiber device comprises an attenuator.

3. The article of claim 1, in which a plurality of VRI regions are disposed within the cladding.

4. The article of claim 1, in which the refractive index of the at least one VRI region varies from above the refractive index of the cladding to less than the refractive index of the core.

5. The article of claim 1, further comprising a second cladding layer surrounding the cladding having a refractive index different from that of the cladding.

6. The article of claim 1, further comprising an outer polymer layer for protecting the length of optical fiber.

7. The article according to claim 1, in which the at least one VRI region is comprised of air.

8. The article according to claim 1, in which the at least one VRI region is comprised of a temperature-sensitive material so that the refractive index of the VRI region may be controlled by heating or cooling the device.

9. The article according to claim 1, in which the at least one VRI region is comprised of a crystal material so that the refractive index of the VRI region may be controlled by a magnetic or electric field applied to the device.

10. The article according to claim 1, in which the at least one VRI region is comprised of doped glass.

11. The article according to claim 10, in which the concentration of dopants is varied within the VRI region to define one or more refractive index gradients.

12. The article according to claim 1, in which the at least one VRI region comprises a hole within the cladding substantially filled with refractive index oil.

13. The article according to claim 1, in which the distance between the center of the core and the at least one VRI region is approximately less than or equal to one mode field diameter.

14. The article according to claim 1 comprising an optical communication system.

15. A device for attenuating a signal propagated along the core of an optical fiber, the device comprising:

an optical fiber section comprising a core fabricated with a material having a predetermined refractive index, a cladding surrounding the core having a refractive index less than the refractive index of the core, and at least one variable refractive index (VRI) region disposed within the cladding in close proximity to the core, the VRI region having a refractive index higher than that of the cladding for modifying the index of the mode of the signal propagated along the core and attenuating the signal.

16. The device of claim 15, in combination with a means for varying the refractive index of the VRI region.

17. A method of attenuating a signal propagated along the core of an optical fiber, the method comprising the steps of:

providing an attenuator device comprising a core fabricated with a material having a predetermined refractive index, a cladding surrounding the core having a refractive index less than the refractive index of the core, and at least one variable refractive index (VRI) region disposed within the cladding in close proximity to the core, the VRI region having a refractive index higher than that of the cladding for modifying the index of the mode of the signal propagated along the core and thereby attenuating the signal; and varying the refractive index of the VRI region to control the degree of attenuation of the signal.

18. The method of claim 17, in which the step of varying the refractive index of the VRI region comprises providing a VRI region including a crystal and applying an electric or magnetic field to the device to alter the refractive index of the crystal.

19. The method of claim 17, in which the step of varying the refractive index of the VRI region comprises adjusting the size, shape or location of the VRI region.

20. The method of claim 17, in which the step of varying the refractive index of the VRI region comprises providing a VRI region including a temperature-sensitive material and changing the temperature of the device to alter the refractive index of the temperature-sensitive material.

* * * * *